Oct. 25, 1932.  B. WALKER  1,884,933
VEHICLE LIFTING AND TRAVERSING DEVICE
Filed May 6, 1931  4 Sheets-Sheet 1
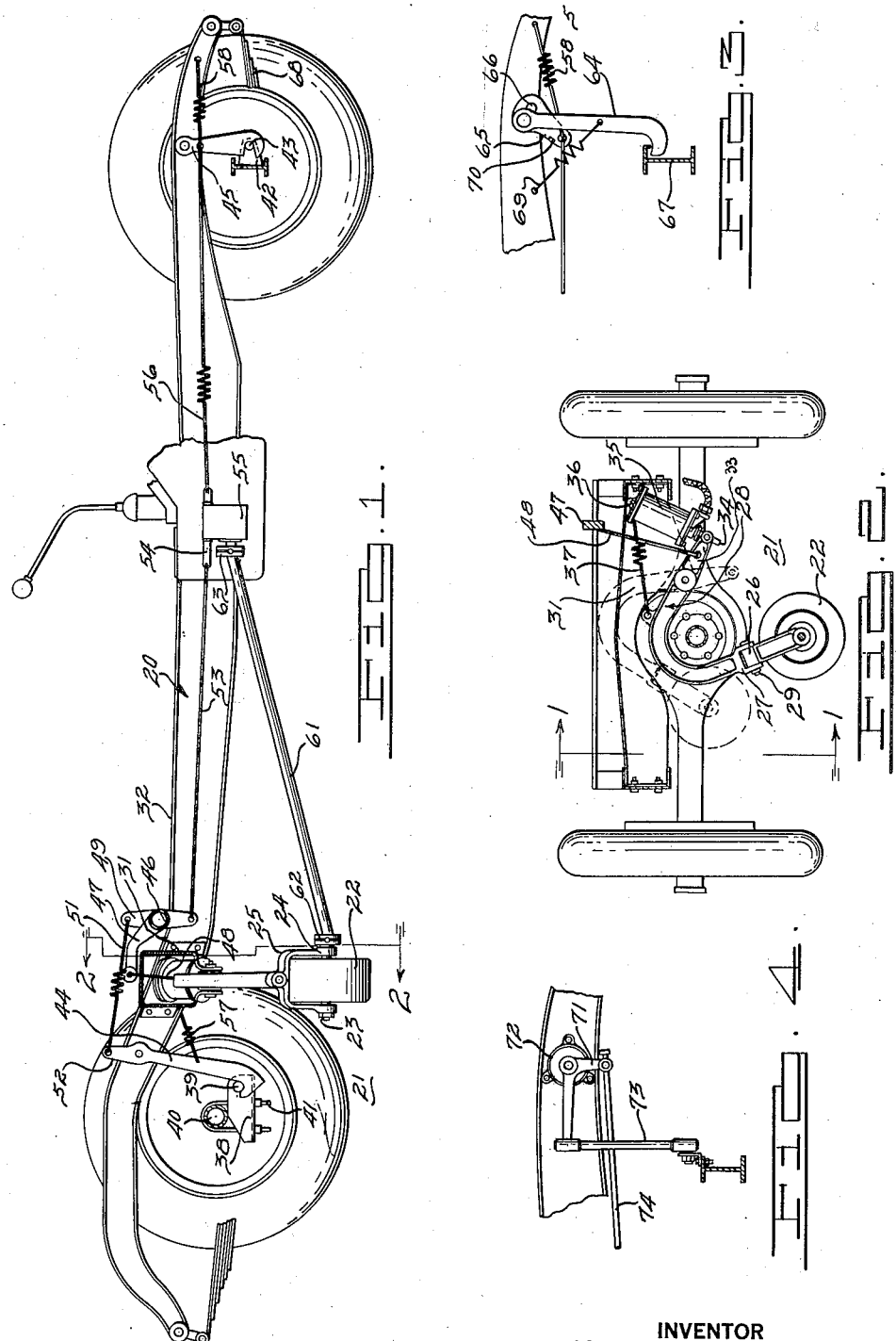
INVENTOR
*Brooks Walker.*
BY
*Harness, Dickey, Pierce & Hann.*
ATTORNEYS.

Oct. 25, 1932.  B. WALKER  1,884,933
VEHICLE LIFTING AND TRAVERSING DEVICE
Filed May 6, 1931   4 Sheets-Sheet 2
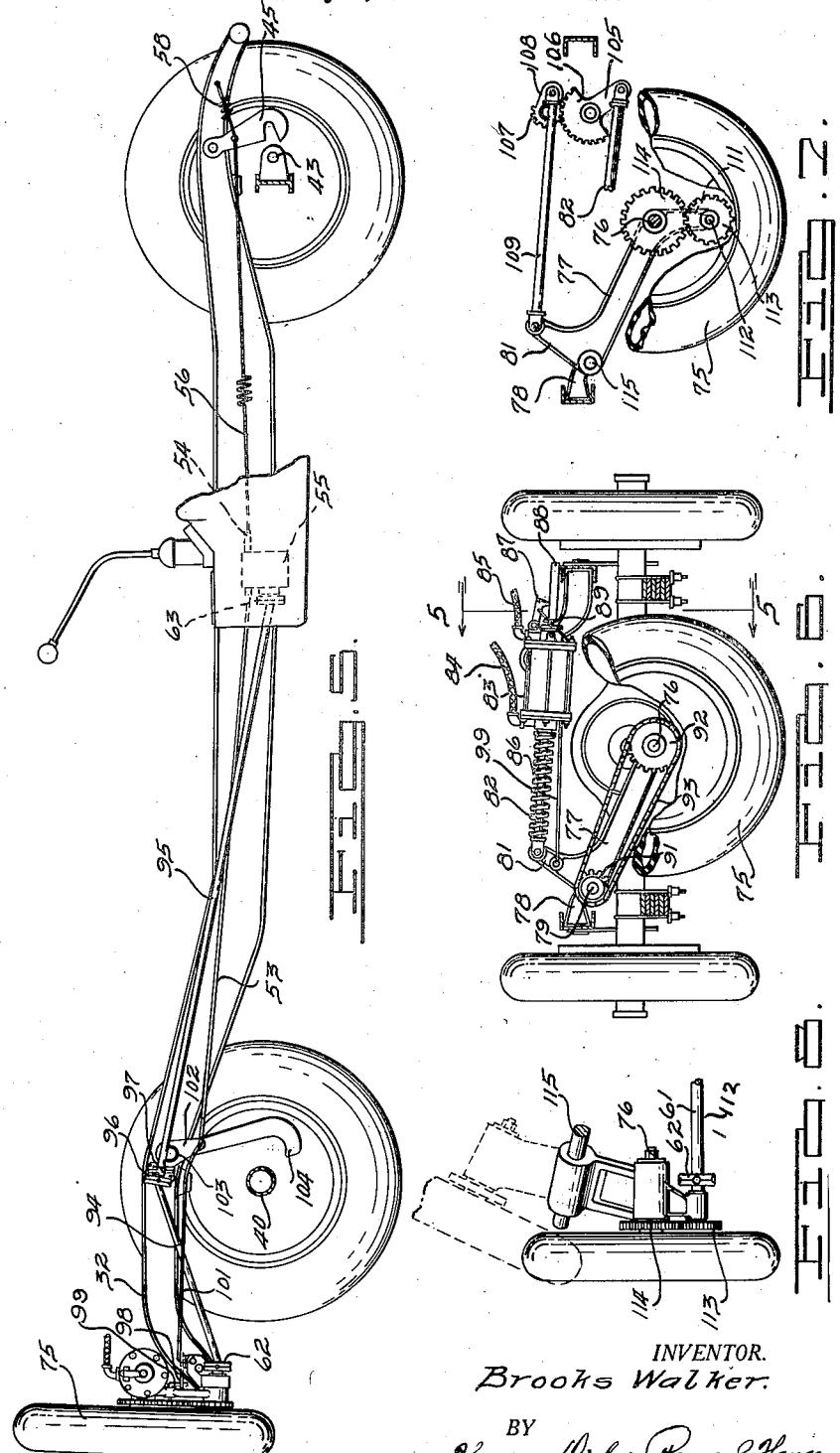
INVENTOR.
Brooks Walker.
BY
Hamus, Dickey, Pierce & Hann.
ATTORNEYS.

Oct. 25, 1932.  B. WALKER  1,884,933

VEHICLE LIFTING AND TRAVERSING DEVICE

Filed May 6, 1931  4 Sheets-Sheet 3

INVENTOR
Brooks Walker.
BY
Harness, Dickey, Pierce & Hann
ATTORNEYS.

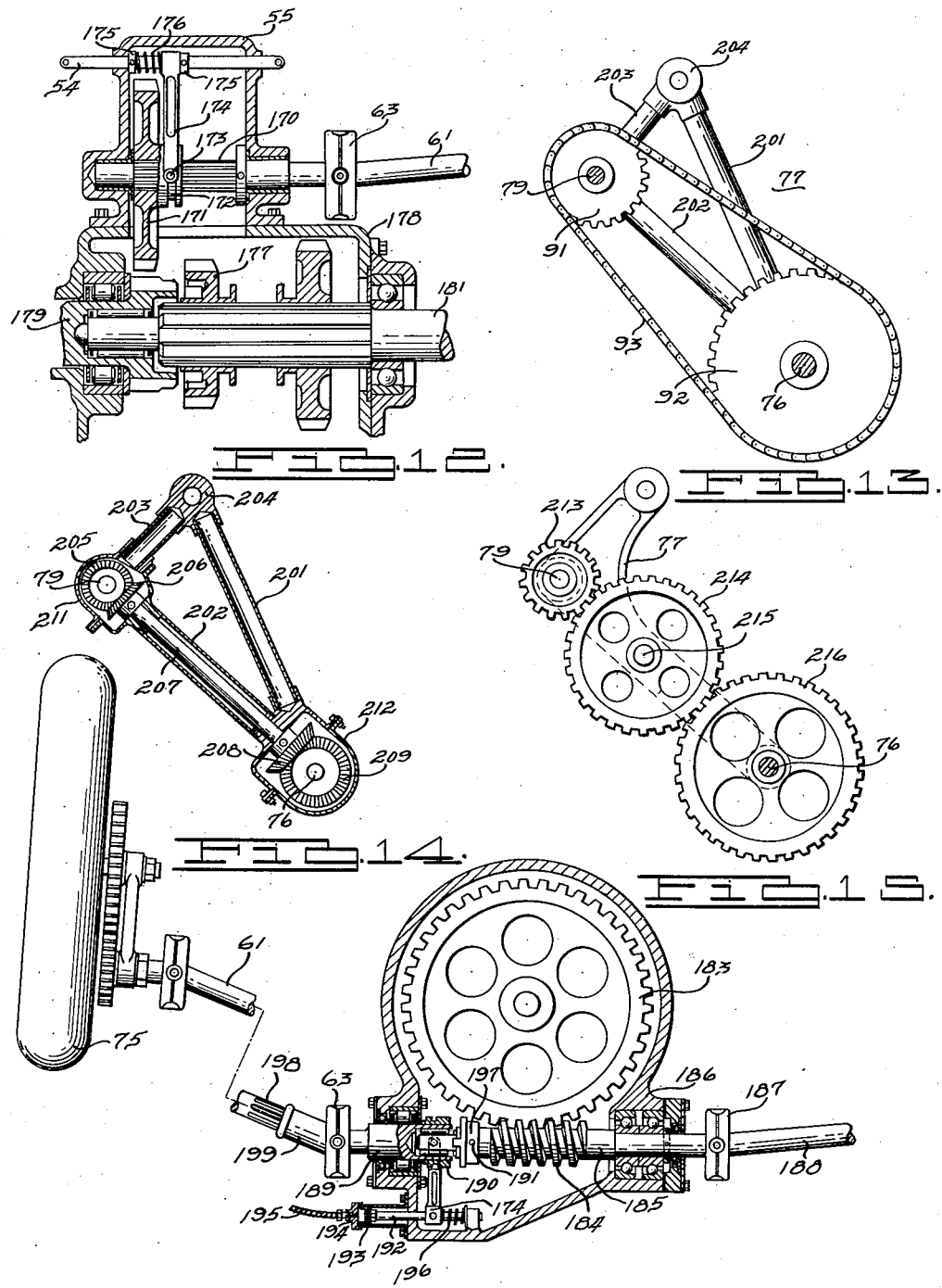

Patented Oct. 25, 1932

1,884,933

UNITED STATES PATENT OFFICE

BROOKS WALKER, OF PIEDMONT, OAKLAND, CALIFORNIA

VEHICLE LIFTING AND TRAVERSING DEVICE

Application filed May 6, 1931. Serial No. 535,380.

My invention relates to vehicle lifting and traversing devices, and particularly to a device which employs a single wheel for raising one end of the vehicle and for driving it in an arc about a point adjacent to the opposite end thereof.

In my co-pending application, Serial No. 533,944, filed April 30, 1931, I have described and claimed a lifting and traversing device for a vehicle wherein a pair of wheels are employed for raising and stabilizing the car during the lifting and traversing operation. My present invention relates to a device employing a single wheel for lifting and traversing a vehicle in conjunction with stabilizing means for retaining the vehicle against tilting movement thereon.

The main objects of my invention are, to provide a lifting and traversing device for a vehicle, of the single wheel type, with operating mechanism which shall actuate the wheel to effect the raising of one end of the vehicle after stabilizing means has been actuated to prevent the tilting of the vehicle; to provide a plurality of hooks on the frame of the vehicle which engage the axle thereof and which are actuated by a common operating element; to provide means for stabilizing the vehicle against sidewise tilting by more firmly anchoring the frame to the axle not elevated to effect stability through the ground engaging wheels; to utilize the spare wheel of the vehicle as the element upon which the vehicle is lifted and traversed; to support the wheel in such manner as to have the wheel disposed centrally of the vehicle when in raised and lowered position; to drive said wheel through suitable mechanism attachable to the driving element of the vehicle; and to provide suitable control means whereby the raising of the vehicle and the connecting of the driving elements are automatically effected through the actuation of a single lever.

Figure 9:
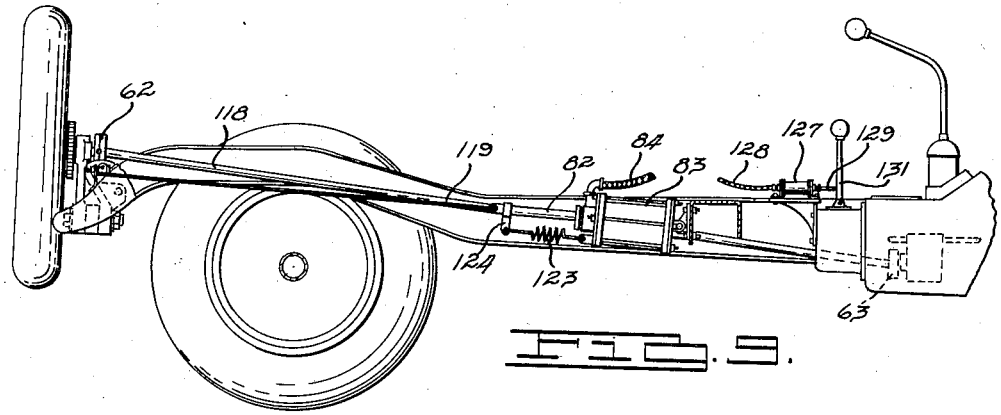
Figure 10:
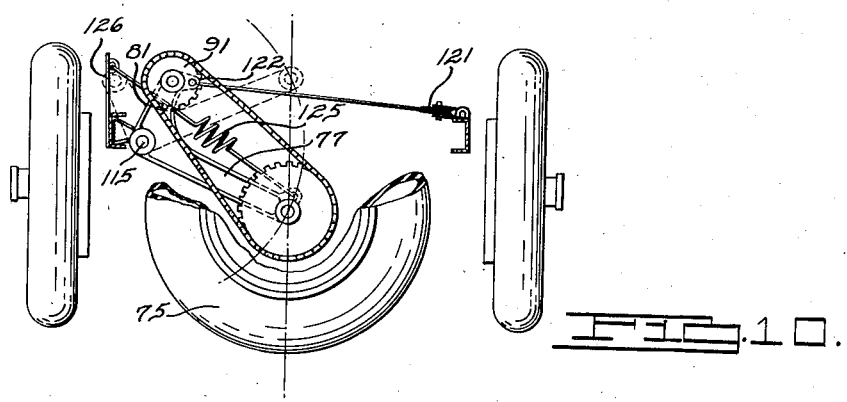
Figure 11:
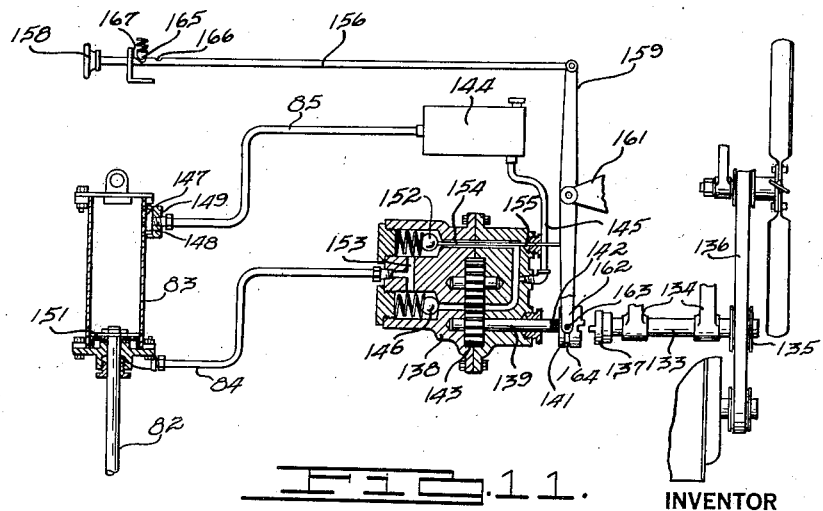

Other objects and features of novelty of my invention will be either specifically pointed out or will become apparent when referring, for a better understanding of my invention, to the following description in conjunction with the accompanying drawings, wherein:

Figure 1 is a view, partly in section, of a chassis of a vehicle provided with a lifting and traversing device which embodies features of my invention, taken on the line 1—1 of Fig. 2, Fig. 2 is a view, partly in section, of the structure illustrated in Fig. 1 taken on the line 2—2 thereof, Fig. 3 is a broken view of the front portion of the structure shown in Fig. 1, illustrating a modified form of stabilizing element which may be employed with my lifting and traversing device, Fig. 4 is a view similar to that of Fig. 3 showing a further modified form which may be employed for effecting the stability of the vehicle, Fig. 5 is a sectional view of a modified form of lifting and traversing device illustrated in Fig. 6, taken on the line 5—5 thereof, Fig. 6 is a sectional view of the structure illustrated in Fig. 5, taken on the line 6—6 thereof, Fig. 7 is a rear view of a lifting and traversing device for a vehicle similar to that illustrated in Fig. 6 showing a modified form thereof, Fig. 8 is a side view in elevation of a lifting and traversing device similar to that illustrated in Fig. 7 showing a modified form thereof, Fig. 9 is a broken sectional view of a vehicle chassis similar to that illustrated in Fig. 5 showing a modified form which my lifting and traversing device may assume, Fig. 10 is a view of a lifting and traversing device similar to that shown in Fig. 6, illustrating a further modified form thereof, Fig. 11 is a view, partly in section and partly in elevation, of the operating and actuating mechanism which may be employed with my lifting and traversing device, Fig. 12 is an enlarged plan view, partly in section, of a portion of a transmission mechanism in reversed position to that shown in Fig. 1 having additional driving means associated therewith for effecting the operation of the traversing device, Fig. 13 is an enlarged view of a supporting and driving arm for the wheel of my lifting and traversing device provided with a sprocket and chain drive for rotating the wheel, Fig. 14 is a sectional view of a supporting arm for a wheel, similar to that shown in Fig. 13, illustrating a modified form of a drive therefor, Fig. 15 is an enlarged view of a supporting arm for a wheel similar to that illustrated in Fig. 7 showing a modified form of drive for the wheel thereof, and Fig. 16 is a broken sectional view of a differential housing and driving means therefor from which power is transmitted to the wheel for effecting its rotation.

Referring to Figs. 1 and 2, I have illustrated an automotive vehicle chassis 20 having a lifting and traversing device 21 which is provided with a single wheel 22 upon which the vehicle is raised and traversed in an arc about the opposite end of the vehicle. A rotatable axle 23 is keyed or otherwise attached to the hub of the wheel 22 and is supported for rotation in bosses 24 of a U-shaped member which spans the upper half of the wheel. The top portion of the U-shaped member 25 is provided with a third boss 26 which is supported on the bifurcated end 27 of a U-shaped member 28 by a pin 29 to permit the angular movement of the U-shaped member and the wheel relative to the arm.

The U-shaped arm 28 is curved to clear the propeller shaft of the vehicle and is supported on a bracket 31 to the frame members 32 of the chassis. An arm 33, on the opposite side of the pivot of the U-shaped member 28 to that supporting the wheel 22, is attached to a piston rod 34 of an actuating cylinder 35 which is pivotally supported to the frame 32 at 36. A spring 37 connects the U-shaped member 25 to the frame and is of sufficient strength to actuate the lifting and traversing device to retrieved position.

To raise the rear wheels of the vehicle it is necessary to rigidly support the rear axle to the frame and to prevent the tilting of the vehicle about the single lifting wheel. I have accordingly provided engaging means for the front axle which clamps the frame rigidly thereto to retain it against tilting movement when the rear end thereof is lifted. Brackets 38, having pins 39 projecting from the sides thereof, are supported on the rear axle 40 by bolts 41 of U-shape and similar brackets 42 having projecting pins 43 thereon are supported on the front axle, the brackets 38 and 42 being disposed adjacent to the wheels thereof. Hooks 44 and 45 are mounted on the frame 32 at the rear and front ends, respectively, thereof having portions in the nature of detents for engaging the pins 39 and 43 respectively.

A shaft 46 extends transversely across the vehicle, the ends thereof being mounted for rotational movement on the frame members 32 of the chassis. An arm 47 is fixed to the shaft 46, the end thereof being connected by a rod 48 to the arm 33 of the U-shaped member 28, for the purpose of moving the arm 47 upwardly when the lifting and traversing device is moved downwardly to raise the vehicle. The upward movement of the arm 47 rotates the shaft 46 in a clockwise direction which movement rotates arms 49 which are attached to the shaft 46 near each end thereof. Springs 51 connect one end of the arms 49 to the ends 52 of the hooks 44 for the purpose of rotating the hooks into engagement with the pins 39 when the shaft 46 is actuated in a clockwise direction. A rod 53 connects one of the other ends of the arms 49 to a slidable bar 54 of a gear box 55 which will be described more fully hereinafter. The opposite end of the rod 54 is attached by a rod or spring 56 to the hook 45 which is actuated into engagement with the pin 43 when the arms 49 are rotated in a clockwise direction. The other end of the other arm 49 is connected by a rod or spring in conjunction with a rod (not shown) to the other hook 45. Spring 57 connects the body portion of the hooks 44 to the frame for the purpose of withdrawing the hooks from engagement with the pins 39 when the shaft 46 and the arms 49 are rotated in a counter clockwise direction. Springs 58 connect the arms 45 to the front portion of the frame 32 for the purpose of withdrawing the hooks 45 from engagement with the pins when the lifting and traversing device is moved to retrieved position.

The operation of the device so far described will now be explained. Assume the lifting and traversing device 21 to be in retrieved or raised position, a fluid is conducted to the cylinder 35 for causing the piston rod 34 to be moved within the cylinder. This movement causes the counter clockwise rotation of the U-shaped member 28 against the bias of the spring 37 to cause the wheel 22 to contact with the ground and to raise the rear end of the vehicle. During the initial movement of the member 28 the upward movement of the rod 48 causes the clockwise rotation of the shaft 46 which effects the engagement of the hooks 44 and 45, with the pins 39 and 43, respectively, to connect the front and rear ends of the frame with each side of the front and rear axle.

The connection of the rear axle with the frame prevents it from sagging because of the rear axle springs, during the upward movement of the frame to thereby reduce the amount of movement required to raise the rear wheels from the ground. The engagement of the frame with the front axle prevents the tilting of the vehicle when supported on the single wheel 22. The rotation of the wheel 22 is effected through a driving shaft 61 which connects the shaft 23 to the gear box 55 through universal joints 62 and 63 which permits the movement of the wheel to lowered and raised position as it swings on the pin 29 through a longitudinal arc.

In Fig. 3, I have shown a hook 64 which is similar to the hook 45, shown in Fig. 1, with the exception that it is supported in eccentric relation to an arm 65 which is pivoted on the frame 32 by a pin 66. The hook engages a flange on the axle 67 when the arm 65 is first actuated clockwise about the pin 66 because of the bias of a spring 69 and the frame 32 is drawn downwardly against the supporting spring 68 of the vehicle through the upward movement of the hook caused by its eccentric support relative to the support of the arm 65.

The tensioning of the vehicle springs 68, during the connection between the frame 32 and axle effected by the hooks 64, prevents the frame from moving upwardly relative to the axle to thereby effect stability. Because of this initial additional tensioning of the front springs by my eccentrically supported hooks, an excess force is required to further depress the springs 68 thereby providing a two-way or complete stability. Pins 70 on the arms 65, effects the disengagement of the hooks 64 from the axle when the arms are rotated in a counter clockwise direction under the influence of the spring 58.

In Fig. 4 I have shown a further modified form of device for effecting the stability of the vehicle, that of providing an arm 71 on the shafts of shock absorbers 72, arms of which are supported through links 73 to the axle. Rods 74 are substituted for the springs 56, provided on the structure illustrated in Fig. 1, for the purpose of positively moving the arms 71 in a clockwise direction to draw the frame 32 of the vehicle downwardly toward the axle against the bias of the supporting springs 68 thereof. The frame in this manner is rigidly retained by the rods 74 relative to the axle 67 against upward movement while the increased bias applied to the springs 68 requires the expenditure of an excessive force for causing the downward movement of the frame and in this manner a two-way stability is also effected when the vehicle is raised on the auxiliary wheel. As shown in Fig. 4, the rod 74 is in its inactive position, allowing freedom of movement to the shock absorber links when the lifting and traversing device is in retrieved position.

In Fig. 5 I have illustrated a modified form of the structure shown in Figs. 1 to 4, in which the wheel 22 is substituted for by the spare wheel 75 conventionally employed on automotive vehicles. The utilization of the spare wheel in place of the auxiliary wheel heretofore employed, not only reduces the manufacturing cost of the device but also provides a larger diameter pneumatic tire for supporting and traversing the vehicle than otherwise could be employed underneath said vehicle.

The spare wheel 75 is supported on an axle 76 which is rotatable with respect to a supporting arm 77 which is mounted on a bracket 78 in pivotal relation to a rotatable shaft 79. An extension 81 is provided on the supporting arm 77 which is engaged by a piston rod 82 actuatable through a cylinder 83 for effecting the clockwise rotation of the arm 77 and therefore the wheel 75 into engagement with the road for raising one end of the vehicle. A conductor 84 is connected to the front end of the cylinder 83 and a conductor 85 communicates with the rear end of the cylinder.

When a fluid is forced through the conductor 84, a piston (not shown) actuates the piston rod 82 to the right, with respect to the structure illustrated in Fig. 6, which movement effects the raising of the vehicle through the clockwise movement of the arm 77. The tensioning of the spring 86, which encompasses the piston rod 82, provides a bias for actuating the piston rod and therefore the arm 77 in reverse direction for retrieving the wheel 75 and supporting it in raised position.

The device is, however, retained in raised position through the engagement of a detent 87 with the end 88 of the piston rod, which engagement is effected during the reverse movement of the piston rod by the bias of the spring 86 or by fluid means through the conductor 85. The detent 87 is retained in engagement with the end 88 of the rod by a spring 89 which provides a sufficient holding force to retain the detent in engagement with the end of the rod against the weight thereof and the normal shock to which it is subjected. The relation between the detent and piston rod being such that a positive movement of the piston rod laterally, effected by the fluid conducted therein, forces the detent 87 to be moved against the bias of the spring 89 out of the path of engagement with the rod to permit the movement of the rod and the actuation of the lifting mechanism.

Suitable driving means for the wheel 75 is provided on the arm 77, herein shown as a pair of sprockets 91 and 92 which are connected by a chain 93. The shaft 79 is driven through a pair of shafts 94 and 95 which are interconnected through the universal joints 62 and 63 and a third universal joint 96 which permits the shafts to be retained above the axle of the vehicle when supported to the frame 32 thereof by a bracket 97. The rotation of the shaft 79, from the gear box 55, rotates the sprocket 91 which movement is transferred through the chain 93 to the sprocket 92 which is mounted in fixed position on the shaft 76 to which the wheel is fixedly supported.

A bell crank 98 is supported on the side of the frame 32 by a suitable bracket, one arm thereof being attached through a rod 99 to the extension 81 of the arm 77 as illustrated in Figs. 5 and 6. The other arm of the bell crank, which is disposed at right angles to the first said arm, is connected by a rod 101 to an arm 102 which is mounted in fixed relation to a shaft 103 supported for pivotal movement between the frame members 32 of the chassis. A link 53 extends frontwardly from the arm 102, through the rod 54 associated with the gear box 55, through a spring 56 to a hook 45 in the same manner as above described with reference to the structure illustrated in Fig. 1. Hooks 104 are attached to the shaft 103 and are actuated by torsion springs shown in the aforementioned co-pending application, along therewith during the movement of the arm 102. When the arm 77 is initially actuated downwardly from retrieved position the rod 99 rotates the bell crank in a counter clockwise direction causing the arm thereof to draw the rod 101 rearwardly to thereby actuate the hooks 104 and 45 into engagement with the rear axle 40 of the vehicle and with the pin 43, respectively, for raising the axle 40 with the vehicle and for providing stability to the vehicle when supported on the single wheel 75. During the movement of the lifting device to retrieved position the opposite movement of the rod 99 causes the forward movement of the rod 101 and the hooks 104 and 45 to thereby release the axle 40 and the pins 43 for normal operation.

In Fig. 7, I have illustrated a modified form of locking and driving structure for the lifting device which embodies my invention. The piston rod 82 is attached to an extension 105 of a gear segment 106 which is in mesh with a gear segment 107 having an extension 108 to which a link 109 is pivoted. The other end of the link 109 is pivoted to the extension 81 of the arm 77 upon the rotatable shaft 76 of which the wheel 75 is fixedly supported. A downwardly extending portion 111 is provided on the end of the arm 77 through which a driving shaft 112 extends and supports a gear 113 in mesh with a gear 114 which is rigidly attached to the shaft 76. The arm is supported to the frame through a pivot 115 which hinges the arm to the bracket 78 supported on the frame 32.

When the cylinder 83 or other similar mechanism is actuated to force the rod 82 to the right, with reference to the structure illustrated in Fig. 7, the counter clockwise rotation of the gear segment 106 causes the clockwise rotation of the gear segment 107 which effects the movement of the rod 109 to cause the clockwise rotation of the arm 77 which moves the wheel into contact with the ground and raises the vehicle. At the end of the movement of the rod 82, the pivot of the rod 109 has moved past center position relative to the pivot of the gear segment, 107 to effect a locking relation therewith for retaining the vehicle in lifted position.

When the rod 82 is moved to the left, from the position illustrated in Fig. 7, caused by the reverse flow of fluid in the cylinder 83, the rod 109 is also moved to the left causing the counter clockwise rotation of the arm 77 and the movement of the wheel 75 into raised position. In this position, the extension 108 of the segment has been rotated through an angle greater than 180 degrees into a position in which the axis of the rod 109 is below the pivot of the gear segment 107 to effect a locking relation therewith for retaining the wheel in raised position. Suitable stops are provided to prevent further rotation of the arm 108 beyond the past center positions and in the structure illustrated, the limiting movement of the piston constitutes the above mentioned stops, when positioned at either end of the cylinder. It is to be understood that suitable driving means, as illustrated in Fig. 6 hereinafter more fully described, is provided for rotating the shaft 112 and the gear 113 when the wheel is in contact with the ground for traversing the vehicle.

In Fig. 8 I have shown a modified form of the device illustrated in Fig. 7 wherein the pivot 115 is disposed in angular relation to the shaft 112 for the purpose of effecting the tilting of the wheel from a vertical plane as it is moved to its raised position, as illustrated in the dotted line view of Fig. 8. This construction permits the spare wheel to assume a tilted position on the vehicle which is the practice on certain types of vehicle body design.

The position of the supporting pivot 115 is such as to be substantially medial of the raised and lowered position of the tire so that the tire, in its raised and its lowered positions, may be substantially on the center line longitudinally through the vehicle, for centrally distributing the load when the vehicle is in raised position and for the artistic effect in having the wheel centered with reference to the vehicle when in raised position.

In Figs. 9 and 10 I have illustrated a further modified form which my lifting and traversing device may assume, that of driving the wheel 75 from a shaft supported on the extension 81 of the arm 77 to thereby eliminate the universal joint 96 and bracket 97 provided on the structure illustrated in Fig. 5, and drive the sprocket 91 directly from a shaft 118 which is supported between the universal joints 62 and 63 above referred to. The cylinder 83 is supported on the central portion of the frame in such manner as to effect a movement to the piston rod 82 thereof longitudinally of the vehicle. A cable 119 extends from the end of the rod 82, about the pulley 121 and is attached to an eye 122 provided on the extension 81 of the arm 77. A spring 123 is provided between the arm 124 mounted on the piston rod 82 and the cylinder 83 for retrieving the piston when the wheel has been returned to raised position by the biasing force of a spring 125 supported between the end of the arm 77 and a bracket 126 mounted on the frame. The hooks for engaging the axle are not illustrated in Figs. 9 and 10 and it is to be understood that hooks similar to those illustrated in the foregoing figures will be employed on both the front and rear axles for lifting the rear axle with the vehicle and for stabilizing the vehicle through the connection of the hooks with the front axle in the manner referred to hereinabove.

When free wheeling is employed on an automobile the braking of the wheels thereof, when in raised position, would be ineffective for braking the vehicle through the wheel 75 in one direction because of the free wheeling structure provided between the drive shaft of the vehicle and the shaft 118 for driving the wheel 75. When free wheeling is employed upon a vehicle, I automatically connect the transmission of the vehicle directly to the rear wheels by suitable mechanism which is actuated at the time the cylinder 83 is being actuated for lowering the wheel to the ground.

In Fig. 9 I have illustrated an auxiliary cylinder 127 which is connected by a conductor 128 to the conductor 84 for the purpose of moving a piston rod 129 in such manner as to actuate the free wheeling shift lever 131 out of free wheeling position. It is to be understood that the cylinder and connection effected in the above mentioned manner is provided for the purpose of illustration and that any other structure, which is capable of being automatically actuated during the lowering operation of the wheel 75, may be employed for rendering the free wheeling mechanism of the vehicle inoperative.

In Fig. 11 I have shown a preferred form of control mechanism which may be employed for operating the lifting and traversing device into extended and retracted position. I have illustrated a mechanism for supplying a fluid to the actuating cylinder of the lifting device and the driving means for the mechanism along with the control levers by which the operation of the lifting device is effected. A shaft 133 is supported in bearings 134 for rotational movement, effected by the engagement of a pulley 135 with a fan belt 136 provided on the automotive vehicle and driven by the motor means thereof in a well known manner, or by any other suitable driving connection.

The opposite end of the shaft 133 to that supporting the pulley 135, supports a portion 137 of a clutch which is rotated during the time the motor means of the vehicle is operated. A fluid pump 138 is supported on the vehicle with the driving shaft 139 thereof axially aligned with the shaft 133 and provided with a portion 141 of the clutch which is slidable on the splined end 142 of the shaft 139. The pump may be of the piston, vane, gear or any other suitable type, and is herein shown as being provided with a pair of gears 143 which effect the movement of the fluid in a well known manner.

The fluid is supplied from a reservoir 144 through a conductor 145 to the suction side of the pump where it is propelled by the gears past a ball check valve 146 through the conductor 84 for drawing the piston rod 82 within the cylinder. The opposite end of the cylinder 83 is provided with a pair of openings 147 and 148 which are encompassed by a chamber 149 to which the conductor 85 is connected. The opposite end of the conductor 85 is connected to the upper portion of the reservoir 144 for the purpose of conducting the fluid from the opposite end of the cylinder 83 from that with which the conductor 84 communicates.

After the piston has reached the end of its stroke, the port or opening 148 is uncovered by the piston and the fluid is by-passed through the opening and the conductor 85 to the reservoir 144. A second ball check valve 152 is conductively joined to the conductor 84 and the ball check valve 146 through a passage 153. The ball check valve 152 closes a port 154 which is in communication with the conductor 145 which supplies the fluid from the reservoir 144 to the pump. A rod 155 extends through the passage 154 into engagement with the ball of the ball check valve 152 and extends from the end of the pump.

A rod 156 extends through the instrument board 157 and is provided with a handle 158 by which the rod is actuated longitudinally of its length. The opposite end of the rod is pivotally connected to a lever 159 which is pivoted on a bracket 161 and which is provided with a bifurcated end 162 having pins 163 therein which register in a slot 164 in the portion 141 of the clutch. A suitable detent 165 engages notches 166 and 167 provided in the rod 156 for the purpose of retaining the rod in the clutch engaged and the clutch disengaged positions. When the rod 156 is in clutch disengaged position the rod 154, employed for actuating the ball check valve 152, is in engagement with the lever 159 and the valve 152 is retained in open position as shown in the figure. When in this position the fluid in the cylinder is forced through the conductor 84, the passage 153, the valve 152, the passage 154 and the conductor 145 to the reservoir 144 because of the bias on the piston rod 82 which moves it downwardly in the cylinder. In this position the lifting device is in retrieved position and if the operator desires to raise and traverse the vehicle thereon he need only grasp the handle 158 and move the rod 156 outwardly until the detent 155 engages the notch 166 provided in the rod.

This movement effects the disengagement of the rod 155 with the lever 159 to permit the ball check valve 152 to move into seated position and also effect the engagement of the clutch parts 137 and 141 to effect the rotation of the shaft 139 and the gears 143. The operation of the pump effects a flow of oil through the conductor 84 into the cylinder 83 for driving the piston 151 therewithin for actuating the piston rod 82 for effecting the operation of the lifting mechanism to raise the vehicle. When the piston has reached the end of its stroke the fluid being supplied to the cylinder will pass through the opening or port 148 which is cleared by the piston, into the reservoir 144 where it may again flow to the pump and be circulated through the system.

The reverse movement of the handle 158 effects the disconnection of the clutch part 137 and 141 and also the release of the valve 152, to permit the fluid, which retains the piston in the vehicle-raised position, to flow from the cylinder. When the rod 156 is moved to a neutral position between the detents 166 and 167 the clutch parts 137 and 141 may be disconnected without actuating the valve 152 to open position and the lifting device is retained in raised position by the presence of the fluid in the system.

A further inward movement of the rod 156 opens the valve 152 to release the fluid and permit the device to be moved to retrieved position. The spring 86 forces the piston to the left end of the cylinder and lifts the device to its retrieved position. It is to be understood that speed sensitive means may be employed, along with suitable electrical control means, in the nature of a solenoid or a clutch, as provided in my above mentioned co-pending application, for simplifying the control mechanism herein shown and for permitting its actuation only when predetermined conditions are present.

In Fig. 12 I have illustrated driving means for the wheel of the lifting and traversing device which is connectible with the transmission mechanism of the vehicle. The gear box 55 is illustrated as being provided with a splined shaft 170 which is bearinged for rotational movement in the box and which extends therefrom in connection with the universal joint 63 for driving the shaft 61 connected to the wheel. A gear 171 is mounted on the splined shaft 170 for rotation therewith and is provided with a slotted collar 172 in which pins 173 of the bifurcated arm 174 engage, for permitting the relative rotation of the gear 171 and for effecting its movement longitudinally of the splined shaft 170.

The arm 174 is slidable on the rod 54 between the collars 175 thereof and a spring 176 encompasses the rod between one of the collars and the arm. The spring permits the full movement of the rod 54 in case the gear 171 fails to move in mesh with the teeth of the driving gear 177 and is available for effecting the meshing of the teeth as soon as they are moved relative to each other. As has been pointed out above the rod 54 is moved during the initial movement of the lifting device to thereby effect the meshing of the gears before the vehicle wheels are raised from the ground so that the braking of the vehicle wheels will effect the braking of the traversing wheel of the device upon which the car is raised. This construction provides full control of the car when it is raised on the traversing wheel on the side of a hill.

The transmission 178 is provided with a driving shaft 179, a driven shaft 181 and a counter shaft (not shown) all of which are conventionally employed in the art. The gear 177 mounted on the splined, driven shaft 181 produces the second or intermediate speed when employed to drive the vehicle and I preferably employ this gear for driving the traversing wheel of my lifting device because of the difficulty which would otherwise ensue in case the gear 171 were connected to the gear which is shiftable for driving the device in either direction.

It will be readily apparent, that, if the car is held against rotation on the traversing wheel through the braking of the wheel of the vehicle and the gear to be shifted, the friction between the shiftable gears will be so great that difficulty will be experienced when the shifting operation is attempted. For this reason I preferably connect the gear 171 with the gear 177 of the transmission and effect the operation of the traversing wheel in either direction through the manipulation of the low and reverse gears for driving the driven shaft 181 in either direction of rotation.

The lowering of the vehicle and the retrieving of the lifting device causes the rod 54 to be moved in reverse direction to slide the gear 171 on the spline shaft 130 out of mesh with the gear 177. The connection and disconnection of the gear 171 with the gear 177 automatically ensues when the lifting device is moved to either of its positions and the complete control of the device is always effected through the braking provided for the vehicle, before the vehicle wheel leaves the ground.

When the gear 177 is constantly in mesh with a gear on the countershaft of the transmission mechanism, as sometimes employed in the art, the direction of rotation of the gear 177 does not reverse when the car is in reverse because it is driven directly from the countershaft and is mounted for rotation relative to the spline shaft 181. When such transmission mechanism is employed the low and reverse gear may be utilized for driving the shaft 61 although I prefer to connect the gear 171 to an auxiliary gear mounted for simultaneous rotation of the driven shaft 181 at some other point within the transmission housing.

It is to be understood that what I prefer to accomplish is to connect the gear 171 with a gear, such as 177, for retaining the shafts 61 and 181 in constant connection with each other while the vehicle is raised, so that a braking force, applied to the driven shaft 181, may at all times be transferred to the shaft 61 in which arrangement the braking torque, which is transmitted through the teeth of the gears 171 and 177, will in no way interfere with the shifting of the gears for effecting the operation of the driven shaft 181 in either direction.

In Fig. 16 I have illustrated a driving connection for the traversing wheel 75 which is connectible to the driving shaft of the differential by automatic means which is actuated during the operation of the lifting device into vehicle raised position. In the device illustrated in the figure, a worm wheel 183 is in mesh with a worm 184 which is bearinged in the differential housing 186 against thrust in either longitudinal direction and is connected through a universal joint 187 to the propeller shaft 188 of the vehicle. The other end of the shaft 185 is bearinged for limited longitudinal movement in the end of a stub shaft 189 which is bearinged in the differential housing 186. The shaft 189 is splined and slidably carries the part 190 of a clutch, which is rotatable with the shaft. The other part 197 of the clutch is mounted in fixed relation relative to the shaft 185 by a pin 191.

An arm 174 is fixed to a piston rod 192 having a piston 193 carried on an end thereof which is retained within a cylinder 194. The cylinder has a conductor 195 leading therefrom in communication with the pump 138 and the conductor 84. A spring 196 encompasses the shaft on the opposite side of the arm to that supporting the piston 193 and is employed for reciprocating the piston rod and therefore the arm 174 to effect the disconnection of the clutch.

When the handle 158 of the control mechanism is pulled outwardly to effect the engagement of the clutch parts 137 and 141 and to operate the pump 138, the fluid propelled thereby is forced through the conductor 84 and also the conductor 195 to effect the operation of the piston rods 82 and 192 respectively. The engagement of the clutch parts 190 and 197 provide a braking and driving connection with the wheel 75 before the vehicle is raised from the ground and the complete control of the vehicle thereby ensues.

When the vehicle is lowered to the ground and the lifting device is moved to raised position, through the disconnection of the clutch parts 137 and 141 and the actuation of the ball check valve 157 to open position, the pressure is relieved from the pistons 151 and 193 respectively and the piston rods are reciprocated to their opposite position by the biasing means associated with each of the piston rods.

While I have illustrated a worm drive for the differential, it is to be understood that the application of power from the differential may, in a similar manner, be taken from other types of differential drives such as the hypoid type wherein a through connection from the propeller shaft may be uitilized. Similar constructions may be employed with a pinion shaft drive and it is to be understood that it is within the purview of my invention to employ an auxiliary shaft mounted in substantially parallel relation to the differential driving shaft suitably connected to the shaft 61 of the lifting device through a clutching arrangement similar to that illustrated in Fig. 16 or that illustrated and described in connection with the shaft shown in Fig. 12.

I have illustrated in Fig. 16 the shaft 61 as being provided with a splined end 198 which is in slidable relation with a similar spline provided within the cylindrical extenson 199 of the universal joint 63. The splined connection is located between the axle and the wheel 75 for the purpose of taking up the differential distance during the motion of either the wheel or the axle. This construction is particularly valuable in the advent of independently sprung wheels in which case there would be no relative motion between the auxiliary wheel and the differential housing when the wheel is in inactive position because of the fact that both are supported on the chassis and are moved simultaneously.

In Figs. 13, 14 and 15, I have illustrated several driving structures that may be utilized for the purpose of rotating the traversing wheel 75. Referring to Fig. 13, I have illustrated the arm 77 for supporting the wheel as being constructed from tubular members 201, 202 and 203 which are joined together to constitute a triangle, the corners of which constitute hubs in which shafts are rotatably supported. The driving shaft 79, about which the arm 77 is pivoted for actuating the lifting device to vehicle raised or lowered position, has a sprocket wheel 91 rigidly attached thereto which drives a sprocket wheel 92, which is rigidly attached to the shaft 76 upon which the wheel 75 is rigidly supported by means of the chain 93. The boss 204 functions in the nature of the extension 81 to which the piston rod 82 is attached for effecting the actuation of the arm 77 into vehicle raised position or to the retrieved position of the device.

In Fig. 14 I have shown a similarly constructed arm in the shape of a triangle formed from tubular members 201, 202 and 203 provided with the actuating boss 204. In this construction, the driving shaft 79 is provided with a bevel gear 205 in mesh with a bevel gear 206 which is connected by a shaft 207, within the tubular member 202 to a bevel gear 208. The gear 208 is in mesh with a bevel gear 209 which is rigidly attached to the shaft 76 upon which the wheel 75 is rigidly supported. The gears 205 and 206 are enclosed within a casing 211 and the gears 208 and 209 are enclosed within a casing 212 which completely seal the gears and permit them to be packed with grease to increase their life and reduce the friction therebetween. The operation of the drive shaft 79 rotates the gear 205 which in turn rotates the gear 206, the shaft 207 and the bevel gear 208, which rotation effects the rotation of the gear 209 and the wheel 79.

In Fig. 15 I have illustrated the arm 77 as being a single member having the drive shaft 79 rigidly connected to a gear 213 which drives, through a gear 214 which is pivoted to the arm 77 on the pivot 215, a gear 216 which is rigidly attached to the shaft 76 upon which the wheels 75 are rigidly attached. The above driving mechanisms are shown and described for the purpose of illustrating the various methods which may be employed for transmitting the rotative movement of the shaft 79 to the wheel 75.

When the spare wheel is, in this manner employed, in conjunction with stabilization effected by the automatic connection of the frame with the axle of the opposite end of the vehicle, a lifting and traversing device is provided which is very economical of manufacture. The single control means provided for connecting the actuating device of the lifting mechanism to a driven element of the vehicle, which at the same time effects the automatic connection of the driven element to the structure for driving the spare wheel, renders the device simple in operation and extremely reliable. The connection of the wheel to the driving means before the vehicle wheels are raised from the ground permits the braking mechanism of the vehicle wheels to be utilized for the purpose of braking the traversing wheel before the vehicle wheels are raised from the ground, thus providing complete control for the vehicle when being raised while positioned on a sloping surface.

While I have described and illustrated several embodiments of my invention, it will be apparent to those skilled in the art that various changes, additions, omissions and substitutions may be made therein without departing from the spirit and scope of my invention, as set forth in the accompanying claims.

I claim:

1. A device for lifting one end of a vehicle in combination with automatically actuated means for anchoring the unelevated end of the vehicle to the axle thereof, to effect a two way stability between said axle and said frame.

2. A device for lifting one end of a vehicle in combination with automatically actuated solid members extending between the frame and the axle at the unlifted end of the vehicle, to effect a two way stability between said axle and said frame.

3. A device for lifting one end of a vehicle on a single wheel, in combination with automatically actuated means for effecting the stability of the vehicle including the rendering of the springs at the opposite end of the vehicle substantially ineffective.

4. A device for lifting one end of a vehicle on a single wheel including, in combination, automatically actuated means for automatically locking the opposite end of the vehicle to the axle thereof, to positively prevent a relative motion between said axle and said vehicle.

5. A device for lifting one end of a vehicle including, in combination, automatically actuated means for locking the sprung portion of the vehicle to the unsprung portion thereof at the unraised end, to positively prevent a relative motion between said sprung and unsprung portions.

6. A device for lifting one end of a vehicle having shock absorbers connected between the sprung and unsprung portions of the vehicle and means rendering the springs of the vehicle substantially inoperative, said means including one of the shock absorber connections at the end not elevated when the lifting device is operated to raise the vehicle.

7. A device for lifting and traversing a vehicle of the free wheeling type including means for raising the vehicle, means for traversing the vehicle laterally, and means for automatically rendering the free wheeling mechanism inoperative when the device is actuated to raise the vehicle.

8. A device for lifting and traversing a vehicle of the free wheeling type having means for raising the vehicle, means for traversing the vehicle laterally, and means for automatically effecting a positive driving connection between the drive shaft and transmission of the vehicle when the device is operated.

9. A vehicle lifting device pivotally supported to the vehicle frame at one side of the longitudinal center line of a vehicle and provided with a ground engaging portion extending on the other side of said center line and so positioned as to swing downwardly to a position substantially on the center line of said vehicle when actuated to the vehicle raised position.

10. A device for lifting and traversing a vehicle including a wheel swingable in an arcuate path traverse of the longitudinal dimension of the vehicle about a point at one side of the vehicle center line to a lifting position substantially under the transverse center thereof, and means for driving said wheel including a rotatable element at a fixed radius relative to said wheel.

11. A device for lifting and traversing a vehicle including a wheel swingable in an arcuate path traverse of the longitudinal dimension of the vehicle about a point at one side of the vehicle center line to a lifting position substantially under the transverse center thereof and means for driving said wheel including an element rotatably supported on the pivot about which said device swings.

12. A vehicle lifting and traversing device supported in its inactive position on the vehicle frame and provided with a mechanism for lowering the device to raise the vehicle, and means for driving said device from a shaft permanently linked to the wheel and supported on the differential housing.

13. A vehicle lifting and traversing device supported in its inactive position on the vehicle frame and provided with a mechanism for lowering the device to raise the vehicle, and means for driving said device for traversing said vehicle, through a constantly connected shaft bearinged to the differential housing in extension of the driving shaft thereof.

14. A device for lifting and traversing a vehicle provided with a mechanism for lowering the device to raise the vehicle, a wheel on said device, and means for driving said wheel from the rear end of the driving shaft of the differential in all positions of said wheel.

15. An auxiliary wheel for lifting and traversing an automotive vehicle, means for supporting said wheel on the vehicle frame, and means for forming a direct driving connection between said wheel and the pinion gear supporting shaft of the differential of said vehicle in all positions of said wheel.

16. A device for lifting and traversing a vehicle provided with a mechanism for lowering the device to raise the vehicle, and driving means including a straight shaft connecting the device to the driving means of the vehicle and extending above the axle thereof.

17. A device for lifting and traversing a vehicle including means for supporting a lifting wheel swingable in an arcuate path transverse of said vehicle from a retracted position substantially on the longitudinal center of the vehicle to a vehicle lifted position substantially on the same center, and separate means for operating said first mentioned means from the retracted position to the vehicle raised position.

18. A device for lifting a vehicle on the spare tire thereof supported in such manner as to be swingable in an arcuate path transverse of the vehicle substantially perpendicular to the ground when in vehicle raising position and tilted from the perpendicular when in retracted position.

19. A lifting and traversing device for a vehicle operable into vehicle lifted position and into retracted position by a mechanism having elements thereof movable into past center relation at both positions of the device.

20. A lifting and traversing device for a vehicle operable into vehicle lifted position and into retracted position, a power actuated mechanism for operating said device, and elements associated with said device movable into past center relation at the inactive position of said device.

21. A lifting and traversing device for a vehicle operable into vehicle lifted position and into retracted position, a toothed element, a mechanism for rotating said element and a toggle associated with said element for effecting its actuation and for moving into over center locking position.

22. A device for lifting and traversing a vehicle through an auxiliary wheel including, in combination, a transmission mechanism having gears for driving the vehicle in forward and reverse speed, a drive shaft for the wheel of the device, a gear carried by said drive shaft, means for effecting the meshing of the last said gear with said gear of the vehicle transmission which is drivable in either direction of rotation.

23. A lifting and traversing device for a vehicle including, in combination, a pivoted arm on which a wheel is swingable from an inactive position to an active position, and an element for driving said wheel located at a point remote from the point of pivot of said arm and at a fixed radius from the axis of said wheel, said radius being greater than zero.

24. A device for lifting one end of a vehicle including, in combination, elements for stabilizing the opposite end of the vehicle against lateral tilting movement, and means for automatically actuating said elements before the opposite end of said vehicle is fully raised.

25. A device for lifting and traversing a vehicle through an auxiliary wheel, the said vehicle having a gear transmission, means for driving the wheel through an auxiliary gear shiftable into mesh with a gear of said transmission which is employed in the normal driving of the vehicle to supply torque from the engine to the vehicle wheels and is rotatable by the vehicle motor in either of two directions.

26. An auxiliary wheel for lifting and traversing an automotive vehicle including in combination means for supporting said wheel on said vehicle, means for lifting said vehicle on said supporting means by fluid pressure, means for driving said wheel connectable with the vehicle driving means, and fluid-operated auxiliary means for effecting said connection automatically when actuated by the same fluid pressure which is utilized for the vehicle lifting operation.

BROOKS WALKER.

Patent No. 1,884,933 Granted October 25, 1932
BROOKS WALKER

The above entitled patent was extended July 24, 1951, under the provisions of the act of June 30, 1950, for 6 years and 214 days from the expiration of the original term thereof.

*Commissioner of Patents.*